United States Patent [19]

Zerressen

[11] Patent Number: 5,243,636
[45] Date of Patent: Sep. 7, 1993

[54] FUEL ASSEMBLY OF A BOILING WATER REACTOR WITH SUPPLEMENTARY FEEDING OF LIQUID COOLANT

[75] Inventor: Karl-Wilheim Zerressen, Saarlouis, Fed. Rep. of Germany

[73] Assignee: Siemens Aktiengesellschaft, Munich, Fed. Rep. of Germany

[21] Appl. No.: 862,516

[22] Filed: Apr. 2, 1992

[30] Foreign Application Priority Data

Apr. 2, 1991 [DE] Fed. Rep. of Germany ... 9103984[U]

[51] Int. Cl.$^5$ ............................................. G21C 3/322
[52] U.S. Cl. .................................................. 376/444
[58] Field of Search ........................ 376/444, 443, 352

[56] References Cited

U.S. PATENT DOCUMENTS 3,629,065 12/1971 Knox ..................................... 376/443
4,708,846 11/1987 Patterson et al. .................... 376/444
4,968,479 11/1990 Ogiya et al. ......................... 376/428

FOREIGN PATENT DOCUMENTS 0282600 1/1992 European Pat. Off. .
88/02176 3/1988 World Int. Prop. O. .

Primary Examiner—Daniel D. Wasil
Attorney, Agent, or Firm—Herbert L. Lerner; Laurence A. Greenberg

[57] ABSTRACT

A fuel assembly for a boiling water reactor includes an elongated case having a bottom, a top and an interior. A base part covers the bottom of the case and has inlet openings formed therein for a liquid coolant acting as a moderator. A head part covers the top of the case and has outlet openings formed therein for a liquid/steam mixture of the coolant. At least one throttle restriction is disposed in a cross-sectional plane between the head part and the base part. A portion of the coolant flows along and between a bundle of fuel rods which are disposed parallel to one another and to the case in the interior of the case. A portion of the liquid coolant is guided through the at least one tube. The at least one tube is disposed parallel to the rods in the bundle between the base part and the head part. The at least one tube has lateral outlet openings formed therein upstream of the cross-sectional plane of the throttle restriction. The at least one tube has a lower end with a liquid inlet formed therein, and the liquid inlet is expanded to render a pressure loss in the coolant flow between the inlet openings in the base part and the cross-sectional plane in the interior of the tube negligibly small as compared with a pressure loss outside the tube.

4 Claims, 6 Drawing Sheets

FUEL ASSEMBLY OF A BOILING WATER REACTOR WITH SUPPLEMENTARY FEEDING OF LIQUID COOLANT

The invention relates to a fuel assembly for a boiling water reactor, including an elongated case being covered at the bottom by a base part and at the top by a head part, having inlet openings in the base part for a liquid coolant acting as a moderator and outlet openings in the head part for a liquid/steam or vapor mixture of the coolant; a bundle of fuel rods along and between which a portion of the coolant flows, are disposed in the interior of the case and are parallel to one another and to the case; and at least one tube through which a portion of the liquid coolant is carried, is disposed parallel to the rods in the bundle between the base part and the head part.

In the fuel assembly of a boiling water reactor, the fuel rods, which are joined into a bundle and are heated by the nuclear reaction, are cooled by a flow of water or some other coolant acting as a moderator, which is carried along the rods. To this end, provision is made for placing the fuel rod bundle in an elongated case being covered at the bottom by a base part and at the top by a head part. Inlet openings are provided in the base part for the coolant in a liquid state and outlet openings are provided in the head part for the coolant in the form of a mixture of liquid and steam or vapor. At some points, at a level of approximately 40 cm, the coolant may reach the boiling point, so that in the lower part of the fuel assembly, approximately 10% of the coolant flow (mass flow) is already in the form of steam or vapor bubbles. The steam or vapor bubble content then increases to approximately 70% at the upper outlet from the fuel assembly.

Such an uneven distribution of moderator leads to a variation in output in the fuel assembly, which already reaches a maximum in the vicinity of the lower inlet, as long as the fuel assembly is still fresh. However, as the length of service increases, the maximum output point shifts upward by the extent to which the fuel in the lower part of the fuel assembly has been depleted.

The uneven depletion is a major disadvantage in terms of economy.

Moreover, at high outputs, thermohydraulic instability can arise unless the throughput of coolant is increased sharply.

It is already known for some fuel rods or entire groups of fuel rods to be replaced with a water rod or water channel, or in other words for a tube disposed in the bundle parallel to the fuel rods to extend from bottom to top in the liquid coolant between the base part and the head part. Such tubes may also be assembled from cylindrical segments or may have a square or even a cross-shaped cross section. In the prior art, the tubes are dimensioned and provided with inlet and outlet openings in such a way that a bypass is created, through which a small portion, for instance a few hundredths, of the entire amount of coolant flowing through the fuel assembly cross section flows through that tube, yet boiling in the channels is avoided. As a result, at least some basic proportion of liquid coolant, which does not depend on the length of time that the fuel has been in service, is delivered to the upper part of the fuel assembly as well.

It has also been proposed that deflector structures be used in such channels, in order to return at least a portion of the bypass flow from the upper end of the tube back to the bottom and through openings to the rod bundle. By enriching the fuel with uranium-235 and/or gadolinium, with the enrichment being variable as a function of the distance from the fuel assembly base, an attempt is made to further even out the axial variation in output and to reduce the shift in output.

If the thermohydraulic instability is to be reduced as well, then an attempt is made to increase the pressure loss in the liquid phase of the coolant.

However, increasing the pressure loss can be so disadvantageous to the reactor output that its advantages are more than cancelled out.

It is accordingly an object of the invention to provide a fuel assembly of a boiling water reactor with supplementary feeding of liquid coolant, which overcomes the hereinafore-mentioned disadvantages of the heretofore-known devices of this general type, which provides a further possibility for evening out an axial variation in output and which can be optimized with a view toward the requirements of the fuel assembly, by means of a suitable structure of the fuel assembly.

The goal is to introduce a considerable proportion of the coolant in liquid form and practically unthrottled into the tube (or more generally into the water channel) at the bottom, and to deliver it downstream at some suitable point to the mixture of liquid and steam or vapor flowing between the fuel rods.

With the foregoing and other objects in view there is provided, in accordance with the invention, a fuel assembly for a boiling water reactor, comprising an elongated case having a bottom, a top and an interior, a base part covering the bottom of the case and having inlet openings formed therein for a liquid coolant acting as a moderator, a head part covering the top of the case and having outlet openings formed therein for a liquid/steam mixture of the coolant; at least one throttle restriction disposed in a cross-sectional plane between the head part and the base part; a bundle of fuel rods along and between which a portion of the coolant flows, the fuel rods being disposed parallel to one another and to the case in the interior of the case; and at least one tube through which a portion of the liquid coolant is guided, the at least one tube being disposed parallel to the rods in the bundle between the base part and the head part, the at least one tube having lateral outlet openings formed therein upstream of the cross-sectional plane of the throttle restriction, the at least one tube having a lower end with a liquid inlet formed therein, and the liquid inlet being expanded to render a pressure loss in the coolant flow between the inlet openings in the base part and the cross-sectional plane in the interior of the tube negligibly small as compared with a pressure loss outside the tube.

In accordance with another feature of the invention, the tube has an open bottom and an open top and forms a rectilinear flow path for the liquid coolant.

In accordance with a further feature of the invention, the tube and the throttle restriction are adapted to the flow cross section and the pressure loss of the coolant between the fuel rods and the case for setting a ratio of the coolant flow entering the tube at the bottom to a total coolant flow flowing through the cross section of the case, to be greater than a ratio of a flow cross section for the coolant flow in the interior of the tube to a total cross section of the case.

In accordance with a concomitant feature of the invention, the throttle restriction and the lateral outlet openings are adapted to the pressure loss of the coolant flowing between the fuel rods and the case for forcing a relatively greater portion of the coolant flow entering the tube at the bottom to leave the tube through the lateral outlet openings, and a relatively smaller portion of the coolant flow to flow through the throttle restriction.

Other features which are considered as characteristic for the invention are set forth in the appended claims.

Although the invention is illustrated and described herein as embodied in a fuel assembly of a boiling water reactor with supplementary feeding of liquid coolant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
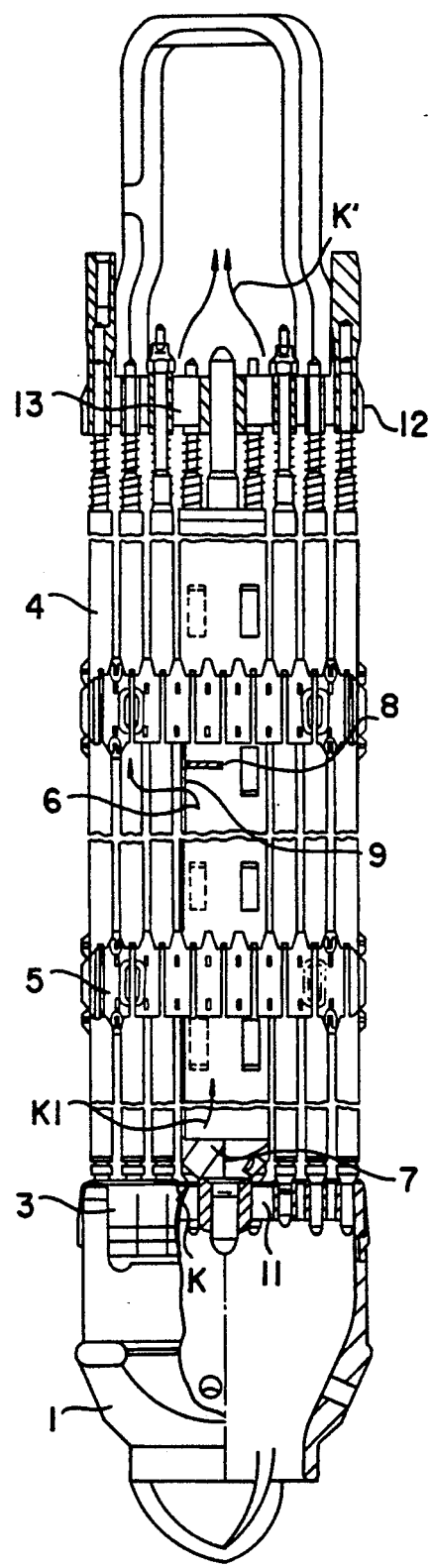
FIG. 1 is a diagrammatic, longitudinal-sectional view of a nozzle fuel assembly.

Referring now to the figures of the drawing in detail and first, particularly, to FIG. 1 thereof, it is seen that reference symbol K represents a flow of coolant, which enters inlet openings 11 in a base part 1 of a fuel assembly from below and is carried inside a fuel assembly case or box to corresponding outlet openings 13 in a head or cap part 12 of the fuel assembly. The fuel assembly case, which is sealed off from the fuel assembly base part by a pinnate spring 3 suggested in the left-hand part of the drawing, has been left out in FIG. 1 in order to show fuel rods 4 and a plurality of spacers 5, which fix the lateral position of the rods in a bundle or cluster, but the case has been given reference numeral 10 in FIG. 4. A bundle or cluster of 3×3 fuel rods 4 is replaced by a tube 6, known as a "water channel", which is disposed in the center of the fuel assembly and on which the spacers 5 are also secured. A lower opening of the water tube 6 is enlarged and provided with lateral guide surfaces at an expanded liquid inlet 7, which conduct a considerable portion of the coolant flow unthrottled into the water channel. A throttle 8 is disposed in a cross-sectional plane that is located in the active region of the reactor core and downstream of lateral outlet openings 9 in the tube wall.

Typically in the state of art, the dimensions of the lower tube openings and the outlet openings at the upper end of a tube that forms this kind of rectilinear flow path for the liquid coolant dictate that the flow of coolant in the tube be only a very slight proportion of the entire coolant throughput.

Figure 2:
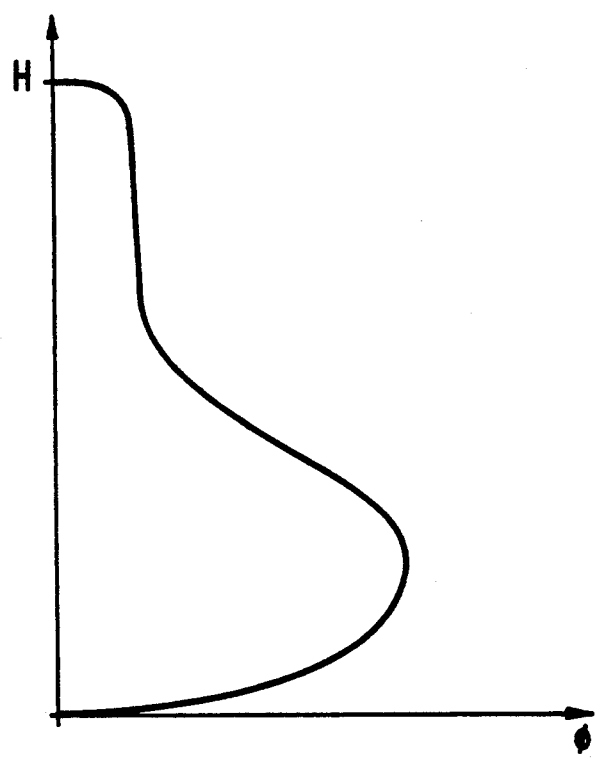
FIG. 2 and 3 are graphs of a vertical distribution of a mean axial output density for a fuel assembly of the prior art.

FIG. 2 shows that with a fresh fuel assembly, a very pronounced development of heat then occurs even in the vicinity of the base, foot or bottom part, and this leads to a first formation of steam or vapor bubbles. The increased proportion of steam or vapor lessens the concentration of the moderator, so that the mean output density in the active zone, extending up to a height H, decreases again. In this state, the most pronounced depletion accordingly already takes place in the vicinity of the fuel assembly base part.

Figure 3:
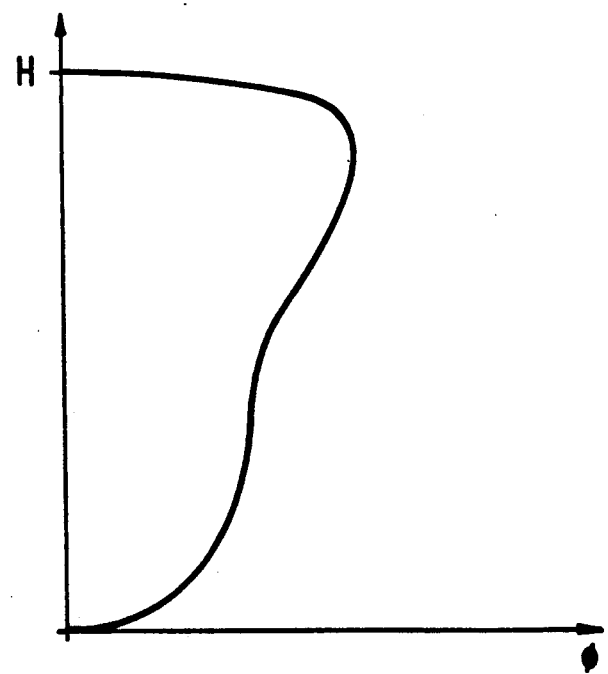

FIG. 3 shows that as the length of service increases, the height of the maximum output does decrease, but shifts considerably toward the less-depleted higher regions of the active zone.

Figure 4:
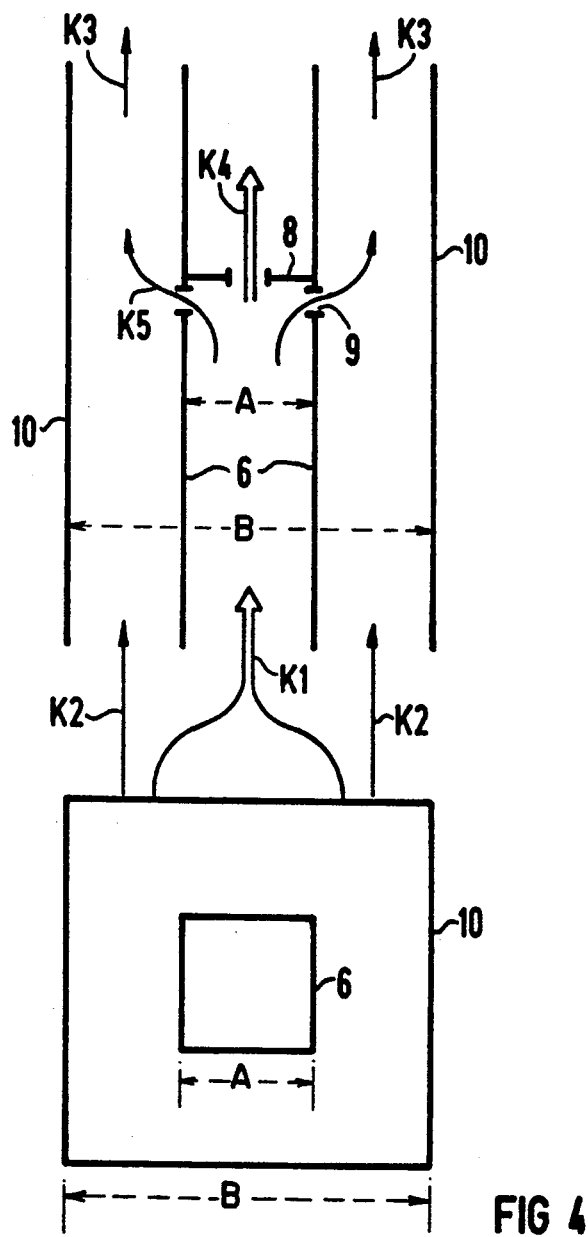
FIG. 4 is a schematic representation of mass flows and their ratios in an example of the novel construction.

The lower part of FIG. 4 shows that the cross section of the water channel 6 amounts to only a small fraction of the inside cross section of the fuel assembly case 10. The tube and in particular the structure of the expanded liquid inlet 7 at the lower tube end, and the throttle restriction, pressure loss occurs in the coolant between the fuel rods and the case, in such a way that the ratio between the coolant flowing into the tube from the bottom (that is, the mass flow represented by an arrow K1) and the total throughput of coolant (that is, the mass throughput represented by arrows K1 and K2 through the cross section of the case) is greater than the ratio between the flow cross sections available for the coolant flow in the tube interior and the total cross section available for the coolant flow in the case. For example, the mass ratios for the flows K1 and K2 may be 30% and 70% of the total mass throughput (K1+K2).

The upper part of FIG. 4 shows a longitudinal section with sides A and B of the rectangular tube 6 and the rectangular case 10, respectively. The ratios among the areas $A^2$, $B^2$ and $B^2 - A^2$ can be calculated. The area $A^2$ is the cross sectional area of the tube 6 (available to the coolant flow K1 inside the tube 6), the area $B^2$ is the cross sectional area of the case 10 (available for the total throughput K1+K2 of coolant through the fuel assembly), and the area $B^2 - A^2$ is the cross sectional area between the case 10 and the tube 6 (available for the coolant flow K2 outside the tube 6). For the relationship B=3A, as shown in FIG. 4, the above-mentioned mass ratios $$K1/(K1+K2)=30\% \text{ and } K2/(K1+K2)=70\%$$

differ greatly from the corresponding area ratios $$A^2/B^2=(1/3)^2 \text{ or } 11\% \text{ and } (B^2-A^2)/B^2=8/9 \text{ or } 89\%.$$

Accordingly, in the middle part of FIG. 4, the arrow K1 is shown to embrace more than only the cross section of the tube 6.

Advantageously, the throttle 8 and the lateral outlet openings 9 are dimensioned in such a way that only a small flow of liquid coolant, represented by an arrow K4 and amounting to 5% of the total mass throughput, for instance, flows through the tube to the upper end of the tube, while a greater flow, represented by an arrow K5, flows through the lateral outlet openings to enter the space between the fuel rods, and together with the flow K2 makes up the flow K3.

Figure 5:
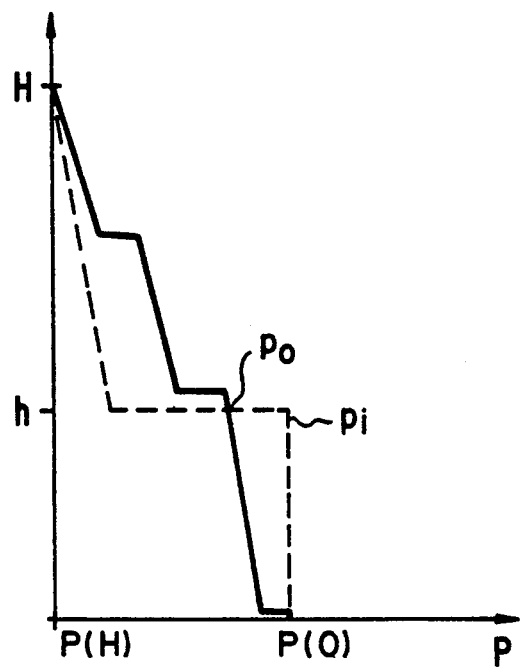
FIG. 5 is a graph of the pressure of coolant inside and outside a water tube.

As is represented by a broken line in FIG. 5, practically a constant pressure prevails in the unthrottled lower portion of the water channel. It is not until approximately the height h at which the lateral outlet openings are disposed, that this pressure is reduced to a low value, and after that it decreases continuously until the end of the tube.

The coolant flowing outside the water tube between the fuel rods and the fuel assembly case, because of the increase in volume from evaporation, undergoes a hydrodynamic pressure loss. The liquid and colder coolant furnished from the interior of the water channel brings about a change in pressure approximately at the height of these openings.

A supplementary feeding of liquid coolant, which is carried through the water channel or some other suitable bypass, can naturally instead be performed at other points, which are distributed over the entire length of the fuel assembly.

With the mass distribution in the lower part of a fresh fuel assembly shown in FIG. 4, the high local output has the effect of creating a dual-phase mixture there, with a high pressure loss. As a result, the pressure outside the water tube is throttled, and the mass throughput of the coolant flow K2 outside the water channel 6 is reduced in favor of a mass throughput rising above 25% in the coolant flow K1. As a result, the volume of the total steam or vapor produced increases in this region. In other words, a steam or vapor bubble content R represented by a broken line in FIG. 6 rises to a first maximum located approximately at the plane of the throttle. By comparison, this steam or vapor bubble content R in FIG. 7 is shown for the case where the water channel 6 does not have the throttle restriction 8 and the lateral openings 9. Accordingly, by means of the novel provision, the steam or vapor bubble content is increased and has a damping effect on the output in the lower part of the fuel assembly.

In the course of a relatively long-term operating cycle, the output in the upper part of the fuel assembly rises. Accordingly, the pressure loss rises in the region of the dual-phase flow in the upper part of the fuel assembly, while it decreases in the lower part. As a result, the mass throughput in the lower part of the water channel decreases in favor of an increased mass throughput outside the water tube in this lower region. The resultant lowering of the steam or vapor bubble content in the lower region of the fuel assembly improves the moderation there and increases the output, so that overall, excessive shifting of the maximum output to the upper part of the fuel assembly is avoided.

Figure 6:
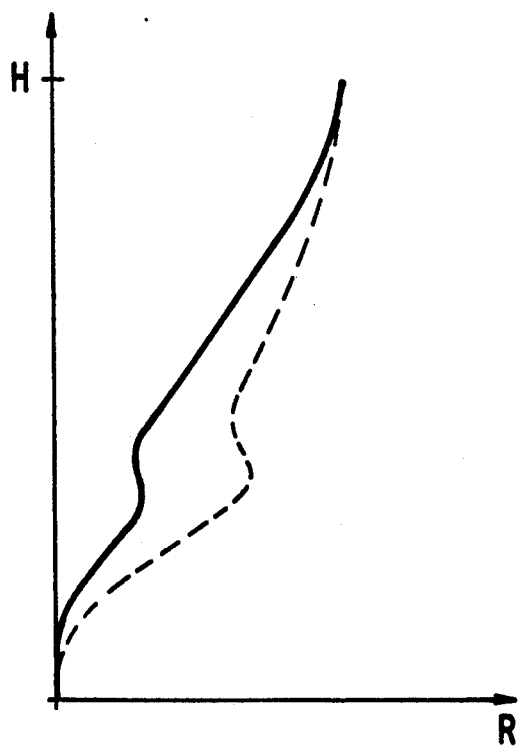
FIGS. 6 and 7 are graphs of a proportion of steam or vapor in a coolant flow plotted as a function of the height in the fuel assembly, for both a fresh fuel assembly and an already partly depleted fuel assembly according to the invention and the prior art.
Figure 7:
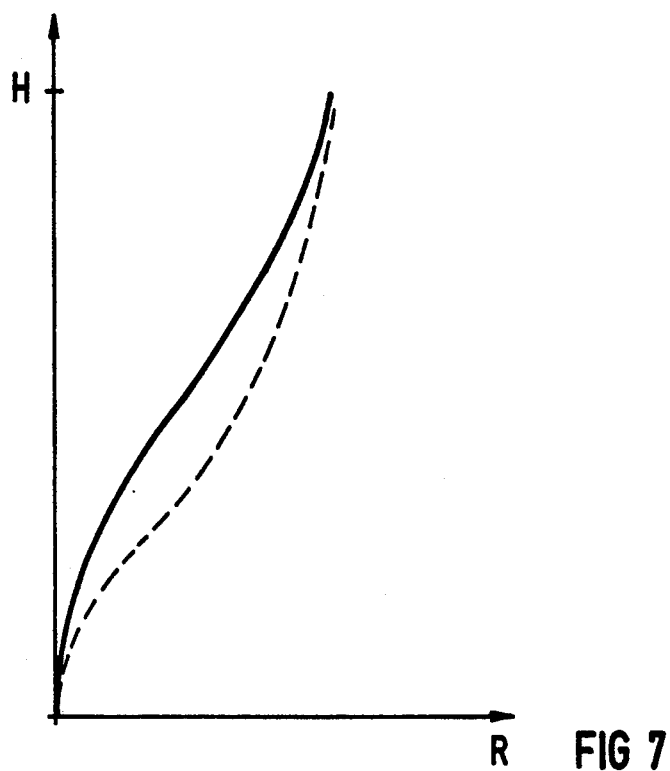

The various bubble contents for the already partly depleted fuel assembly are shown in FIGS. 6 and 7 with a solid line. They accordingly effect a kind of self-control of the variation in output.

With the throttle restriction and the lateral outlet openings, an additional non-linearity is introduced into the entire fuel assembly system. The fuel assembly acts like two (or more) different segments, placed on one another, with different mass flows. These segments then also have different natural frequencies, because of the differences in throughput. The security against instability is also increased thereby.

Figure 8:
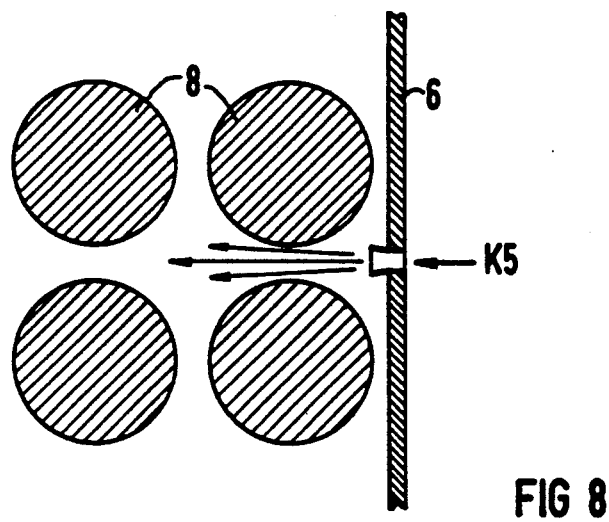
FIG. 8 is a fragmentary, cross-sectional view of part of a tube wall, carrying a lateral outlet opening, and fuel rods.

Advantageously, the through openings are constructed in such a way that the liquid coolant is injected from the interior of the tube 6 out into the passageways between the rods 4, as suggested in FIG. 8.

Figure 9:
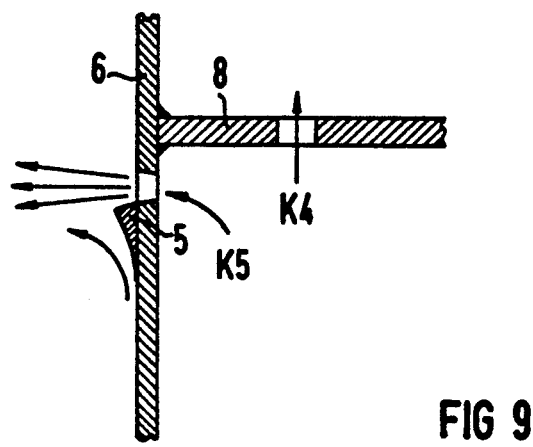
FIGS. 9 and 10 are respective fragmentary, longitudinal-sectional views of a part of a tube carrying a lateral outlet opening and a throttle restriction.
Figure 10:
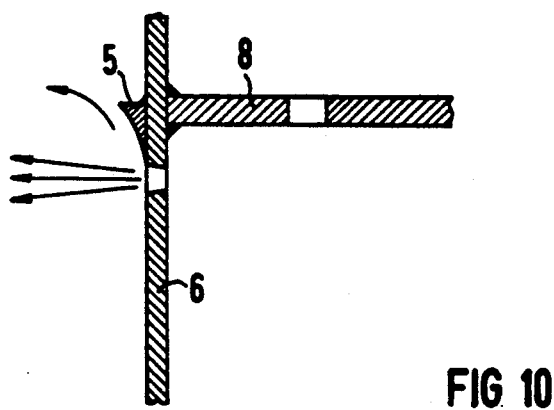

With an appropriate corresponding shaping of the tube wall in the upwardly oriented coolant flow K2 outside the water channel, the lateral outlet openings may also exert a certain jet action on the coolant flow K4 emerging from the water channel. This is shown in FIG. 9 in a longitudinal section through a wall of the water tube or channel. Since the spacer 5 of FIG. 1 rests with its inner edge on the water channel, such lateral protrusions of the channel wall can in particular be achieved by means of the shaping of the spacer.

It is advantageous in this connection to place a corresponding spacer 5 downstream of the lateral outlet openings, in other words above the lateral outlet openings. Through the use of the shaping of the spacer, for instance with flow guide surfaces aimed at the fuel rods, a horizontal component in the vertically flowing coolant flow K3 can be generated that leads to mixing of the partial coolant flows flowing in the various spaces between fuel rods, and therefore distributes the supplementally fed coolant flow K5 more uniformly over the cross section of the fuel assembly.

By introducing a throttle restriction into the water tube and downstream of the inlet opening of the water tube, along with lateral outlet openings in the water tube, the novel construction thus makes it possible to even out the local output density. This provision can additionally be employed for staggered enrichment of the fuel with uranium-235 and/or gadolinium, and the dimensioning of the water tube with its throttle and the lateral outlet openings should be optimized in terms of the mass distribution and volumetric distribution, which are discussed in this case only by way of example, and in terms of the depletion ratios effected thereby. The optimization must also take into consideration the fact that an excessive pressure loss can disadvantageously affect the output of the entire nuclear reactor. In particular, the aforementioned provisions are therefore employable whenever only some of a number of old fuel assemblies in the reactor core, those exhibiting a greater pressure loss, are replaced with new fuel assemblies. Due to the improved construction, the new fuel assemblies initially have a lesser pressure loss, which through the use of these provisions can be adapted to the pressure loss in the other fuel assemblies.

I claim:

1. A fuel assembly for a boiling water reactor, comprising:
   a) an elongated case having a bottom, a top and an interior, a base part covering the bottom of said case and having inlet openings formed therein for a liquid coolant acting as a moderator, a head part covering the top of said case and having outlet openings formed therein for a liquid/steam mixture of the coolant;
   b) a bundle of fuel rods along and between which a portion of the coolant flows, said fuel rods being disposed parallel to one another and to said case in the interior of said case; and
   c) at least one tube through which a portion of the liquid coolant is guided, said at least one tube
      i) being disposed laterally of and parallel to said rods in said bundle between said base part and said head part;
      ii) having at least one throttle restriction disposed in its interior in a cross-sectional plane between said head part and said base part;

iii) having a lower end with a liquid inlet formed therein; and iv) having lateral openings formed therein upstream of the cross-sectional plane; and d) said tube and said liquid inlet being shaped to generate a pressure loss $P(o) - p_i$ being negligibly small as compared with a pressure loss $P(o) - p_o$, where $P(o)$ is a pressure of the coolant passing through said inlet openings of said base part, $p_i$ is a pressure of the coolant inside said tube at the cross-sectional plane, and $p_o$ is a pressure of the coolant outside said tube at the cross-sectional plane.

2. The fuel assembly according to claim 1, wherein said tube has an open bottom and an open top and forms a rectilinear flow path for the liquid coolant.

3. The fuel assembly according to claim 1, wherein said tube and said throttle restriction are adapted to a flow cross section of said tube and said pressure loss $P(o) - p_o$ for setting a ratio of the coolant flow entering said tube at the bottom to a total coolant flow flowing through the cross section of said case, to be greater than a ratio of a flow cross section for the coolant flow in the interior of said tube to a total cross section of said case.

4. The fuel assembly according to claim 1, wherein said throttle restriction and said lateral outlet openings are adapted to the pressure loss of the coolant flowing between said fuel rods and said case for forcing a relatively greater portion of the coolant flow entering said tube at the bottom to leave said tube through said lateral outlet openings, and a relatively smaller portion of the coolant flow entering said tube to flow through said throttle restriction.

* * * * *

UNITED STATES PATENT AND TRADEMARK OFFICE
CERTIFICATE OF CORRECTION

PATENT NO. : 5,243,636
DATED : September 7, 1993
INVENTOR(S) : Karl-Wilhelm Zerressen It is certified that error appears in the above-indentified patent and that said Letters Patent is hereby corrected as shown below:

ON THE TITLE PAGE:

In the heading, item 75 change

"Karl-Wilheim" to

-- Karl-Wilhelm --.

Signed and Sealed this

Twenty-ninth Day of March, 1994

*Attest:*

BRUCE LEHMAN

*Attesting Officer*  *Commissioner of Patents and Trademarks*